(12) United States Patent
Paige

(10) Patent No.: US 12,599,128 B2
(45) Date of Patent: Apr. 14, 2026

(54) COMPOSITION AND METHOD FOR IMPROVING AGRONOMIC TRAITS OF A PLANT

(71) Applicant: THE BOARD OF TRUSTEES OF THE UNIVERSITY OF ILLINOIS, Urbana, IL (US)

(72) Inventor: Ken N. Paige, Monticello, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 142 days.

(21) Appl. No.: 18/405,062

(22) Filed: Jan. 5, 2024

(65) Prior Publication Data

US 2025/0221406 A1      Jul. 10, 2025

(51) Int. Cl.
| | |
|---|---|
| *A61K 31/137* | (2006.01) |
| *A01N 31/02* | (2006.01) |
| *A01N 37/02* | (2006.01) |
| *A01P 21/00* | (2006.01) |
| *A61P 25/24* | (2006.01) |

(52) U.S. Cl.
CPC ............. *A01N 31/02* (2013.01); *A01N 37/02* (2013.01); *A01P 21/00* (2021.08)

(58) Field of Classification Search
CPC ................................ A01N 25/30; A01N 31/02
See application file for complete search history.

(56) References Cited

U.S. PATENT DOCUMENTS

| | | |
|---|---|---|
| 6,245,717 B1 | 6/2001 | Dean |
| 2022/0312710 A1 | 10/2022 | Paige |

FOREIGN PATENT DOCUMENTS

KR      20010012220 A   *   2/2001

OTHER PUBLICATIONS

Croda Crop Care, "Tween 20", https://www.crodacropcare.com/en-gb/product-finder/product/248-tween_1_20#product-brochures-and-guides, accessed May 24, 2024. (Year: 2024).*
Steffens et al., "Selection of Fatty Acid Derivatives: Surfactant Formulations for the Control of Plant Meristems", J. Agr. Food Chem., vol. 17, No. 2, pp. 312-317 (Year: 1969).*
Cathey, Science, 153, 1966, 1382-1383.*
Tso et al., J Agri Food Chem, 13(1), 1965, 78-81.*
Sachs, Hortscience, 7(5), 1972, 440-447.*
Parker, K.E. (2016) "Agronomic Management of Soybean with Foliar Manganese and Apical Meristem Alterations," Master's Thesis, University of Illinois at Urbana-Champaign.
Sonderegger, E. (2013) "High Yield Soybean Management: Planting Practices, Nutrient Supply, and Growth Modification," Theses, Dissertations, and Student Research in Agronomy and Horticulture. 66.
2016 Regional Report, "Breaking Apical Dominance in Soybean," Monsanto.
Orlowski, J.M., et al. (2015) "Early-Season Lactofen Application has Limited Effect on Soybean Branch and Mainstem Yield Components," Crop Sci. 56:1-7.
Cathey, H.M., et al. (1966) "Chemical Pruning of Plants," Science 153:1382-83.

* cited by examiner

*Primary Examiner* — Kyle A Purdy
(74) *Attorney, Agent, or Firm* — Licata & Tyrrell P.C.; Jane Massey Licata

(57) ABSTRACT

Compositions and methods for improving one or more agronomic traits of a plant are provided, which include the use of one or more fatty acids that kill or inhibit the growth of cells in the shoot apical meristem and optionally one or more surfactants. Use of the composition between vegetative growth stage 1 (V1) and vegetative growth stage 6 (V6) is described.

6 Claims, 2 Drawing Sheets

COMPOSITION AND METHOD FOR IMPROVING AGRONOMIC TRAITS OF A PLANT

BACKGROUND

There is a need for reproducible, cost-effective, and sustainable methods for improving plant agronomic traits. Climate change is reducing the amount of arable land around the world. At the same time, the world population is increasing. Petrochemical-based agriculture, that uses large amounts of fuel and organic pesticides to meet food demands, is not sustainable because of climate change. Plant-based fuels must replace petrochemical fuels to reduce global warming, but cultivation of oil seed crops compete with much needed food production. As a consequence, there is a growing demand for methods and new plant cultivars capable of improving agronomic traits such as yield, drought tolerance, disease resistance, and the like.

Plants possess a myriad of defense mechanisms against herbivores, pathogens, and pests. One such defense mechanism is the constitutive or inducible production of chemical compounds to deter infestation. This defense strategy is called resistance or chemical resistance. Another defense mechanism involves regrowth strategies known as tolerance. One possible outcome is the phenomenon known as over-compensation wherein one or more agronomic traits, including seed production, are improved. If the apical meristem of the plant is removed, or the growth of the apical meristem is inhibited, some plants may undergo endoreplication thereby increasing their fitness via the phenomenon of overcompensation. Endoreduplication is the replication of the genome without mitosis. For example, it has been demonstrated that the *Arabidopsis thaliana* ecotype Columbia-4 employs endoreduplication following removal of the shoot apical meristem and that it overcompensates, i.e., increases seed yield (Scholes & Paige (2014) Molecular Ecology 23:4862-4870). U.S. Pat. No. 11,751,522 B2 describes a method of improving agronomic traits of plants, including yield, drought tolerance, and pest/pathogen resistance by clipping the plant's shoot apical meristem at an advantageous time in the growth cycle of the plant. For example, this patent discloses that removal of the shoot application meristem of soybean plants between vegetative stage 1 and 2 or vegetative stage 2 and 3 improves a number of agronomic traits including seed yield and vigor.

There is a need to improve plant agronomic traits. There is a need for more plant varieties that are capable of overcompensating (increasing seed yield and associated traits) when the apical meristem is removed, or the growth of the apical meristem is inhibited. There is a need for more plant varieties that exhibit improved overcompensation when the apical meristem is removed, or the growth of the apical meristem is inhibited. Plants that overcompensate exhibit improved agronomic traits including, but not limited to, one or more of increased seed yield, improved drought tolerance, and improved pest/pathogen resistance, compared to control plants with intact and functional apical meristems. The present invention addresses this need in the art.

SUMMARY OF THE INVENTION

The present invention provides a method of improving one or more agronomic traits of a plant by applying an effective amount of a composition comprising one or more fatty acids to the shoot apical meristem of the plant. In some aspects, the one or more fatty acids is selected from the group consisting of methyl decanoate, 1-decanol, and methyl nonanoate. In another aspect, the one or more fatty acids is one or a combination of methyl esters of C6, C8, C10, and C12 fatty acids. In a particular aspect, the composition is composed of about 4% of the methyl ester of the C6 fatty acid; about 56% of the methyl ester of the C8 fatty acid; about 38% of the methyl ester of the C10 fatty acid; and about 2% of the methyl ester of the C12 fatty acid, based on total fatty acid of the composition. In some aspects, the one or more fatty acids are present in the composition at a concentration of at least 0.025 M. In other aspects, the one or more fatty acids are present in the composition at a concentration in the range of 0.025 M to 0.10 M. In some aspects, the composition further comprises one or more surfactants, e.g., polyoxyethylene sorbitan esters, polyoxyethylene alcohols, alkylarylpolyether alcohols, phthalic glycerol alkyl resins, ethoxylated imidazoline, decanoic acid, diglycol oleate, polyether sulfonates, alkylaryl sulfonates, and mixtures thereof. In some aspects, the one or more surfactants are present at a 1:1 ratio, by weight, with the one or more fatty acids of the composition. In certain aspects, the one or more agronomic traits include seed yield, tuber yield, fruit yield, pod yield, seed oil content, seed protein content, seed starch content, biomass, flower number, drought tolerance, pest tolerance, and/or pathogen tolerance. In one aspect, the method further includes the step of harvesting one or more commercially relevant portions of the plant, e.g., seeds, tubers, fruit, pods, oil, protein, starch, leaves, fiber, terpenes, and wood. In some aspects, the plant is wheat, rye, barley, triticale, oats, sugar beet, fodder beet, apple, pear, plum, peach, almond, cherry, strawberry, raspberry, blackberry, gooseberry, lentil, pea, alfalfa, soybean, rape, mustard, olive, sunflower, coconut, cocoa bean, castor oil plant, oil palm, ground nut, squash, cucumber, melon, cotton, flax, hemp, jute, orange, lemon, grapefruit, mandarin, broccoli, spinach, lettuce, asparagus, cabbage, carrot, onion, tomato, potato, paprika, avocado, cinnamon, camphor, corn, sugar cane, tobacco, nut, coffee, tea, banana, grape, hop, turf, or rubber plant. In some aspects, the one or more fatty acids is applied to the shoot apical meristem of the plant between vegetative growth stage 1 (V1) and vegetative growth stage 6 (V6).

The present invention also provides an agricultural composition composed of (a) one or more surfactants, and (b) one or more fatty acids comprising (i) methyl decanoate, 1-decanol, or methyl nonanoate; or (ii) a combination of methyl esters of C6, C8, C10, and C12 fatty acids. In some aspects, the composition is composed of about 4% of the methyl ester of the C6 fatty acid; about 56% of the methyl ester of the C8 fatty acid; about 38% of the methyl ester of the C10 fatty acid; and about 2% of the methyl ester of the C12 fatty acid, based on total fatty acid of the composition. In some aspects, the one or more fatty acids are present in the composition at a concentration of at least 0.025 M. In other aspects, the one or more fatty acids are present in the composition at a concentration in the range of 0.025 M to 0.10 M. In still other aspects, the one or more surfactants are selected from the group consisting of polyoxyethylene sorbitan esters, polyoxyethylene alcohols, alkylarylpolyether alcohols, phthalic glycerol alkyl resins, ethoxylated imidazoline, decanoic acid, diglycol oleate, polyether sulfonates, alkylaryl sulfonates, and mixtures thereof. In further aspects, the one or more surfactants are present at a 1:1 ratio, by weight, with the one or more fatty acids of the composition.

DETAILED DESCRIPTION OF THE INVENTION

Figure 1:
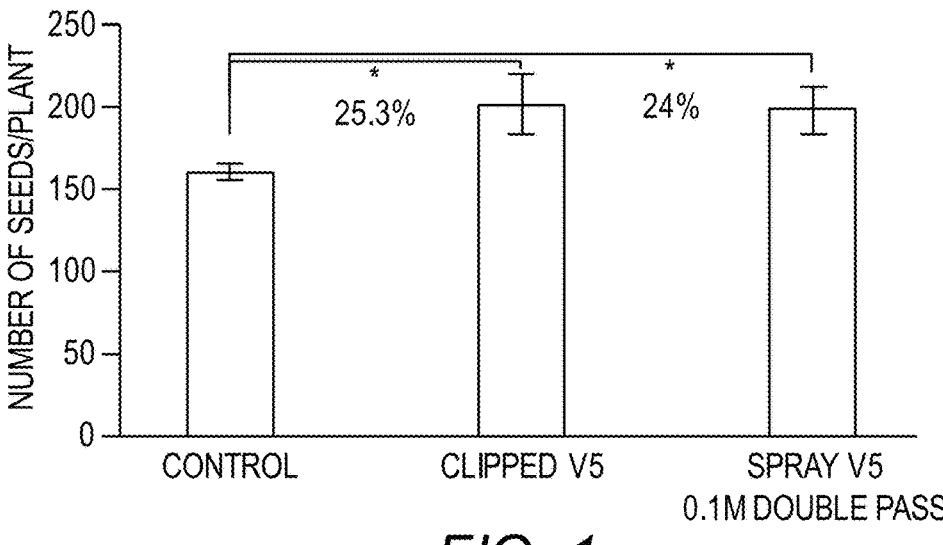
FIG. 1 provides an example of an increase in soybean seed production following the removal of apical dominance by spraying with a double pass of 0.1M methyl decanoate (199.0±14.14 seeds/plant on average) at the V5 stage of growth compared to untreated controls (160.47±5.33 seeds/plant on average) conducted in Pleasant Plains, Illinois. These results are similar to those from mechanical clipping (201.19±18.61 seeds/plant on average), with no statistical difference between sprayed and mechanically clipped plants (p>0.05) resulting in a 24% and 25.3% higher seed production, respectively, than the untreated control (F=3.33, 2, 38 df, p=0.046). Asterisks show significance differences at the 0.05 level.

The following descriptions and examples illustrate embodiments of the present disclosure in detail. Although the present disclosure has been described in some details by way of illustration and example for purposes of clarity and understanding, it will be apparent that certain changes and modifications can be practiced within the scope of the appended claims.

Although various features of the disclosure can be described in the context of a single embodiment, the features can also be provided separately or in any suitable combination. Conversely, although the present disclosure can be described herein in the context of separate embodiments for clarity, the present disclosure can also be implemented in a single embodiment. It is to be understood that the present disclosure is not limited to the particular aspects described herein and as such can vary. Those of skill in the art will recognize that there can be variations and modifications of the present disclosure, which can be encompassed within its scope.

It is intended that every maximum numerical limitation given throughout this specification include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All terms are intended to be understood as they would be understood by a person skilled in the art. Unless defined otherwise, all technical and scientific terms used herein have the same meaning as commonly understood by one of ordinary skill in the art to which the disclosure pertains.

In this application, the use of the singular includes the plural unless specifically stated otherwise. It must be noted that, as used in the specification, the singular forms "a," "an," and "the" include plural referents unless the context clearly dictates otherwise.

In this application, the use of "or" means "and/or" unless stated otherwise. The terms "and/or" and "any combination thereof" and their grammatical equivalents as used herein, can be used interchangeably. These terms can convey that any combination is specifically contemplated. Solely for illustrative purposes, the following phrases "A, B, and/or C" or "A, B, C, or any combination thereof" can mean A individually; B individually; C individually; A and B; B and C; A and C; and A, B, and C. The term "or" can be used conjunctively or disjunctively unless the context specifically refers to a disjunctive use.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. It is contemplated that any aspect described herein can be implemented with respect to any method or composition herein, and vice versa. Furthermore, compositions of the present disclosure can be used to achieve the methods described herein.

The term "about" or "approximately" means within an acceptable error range for the particular value as determined by one of ordinary skill in the art, which will depend in part on how the value is measured or determined, i.e., the limitations of the measurement system. For example, "about" can mean within 1 or more than 1 standard deviation, per the practice in the art. Alternatively, "about" can mean a range of up to 20%, up to 10%, up to 5%, or up to 1% of a given value. In another example, the amount "about 10" includes 10 and any amounts from 9 to 11. In yet another example, the term "about" in relation to a reference numerical value can also include a range of values plus or minus 10%, 9%, 8%, 7%, 6%, 5%, 4%, 3%, 2%, or 1% from that value. Alternatively, particularly with respect to biological systems or processes, the term "about" can mean within an order of magnitude, preferably within 5-fold, and more preferably within 2-fold, of a value. Where particular values are described in the application and claims, unless otherwise stated the term "about" meaning within an acceptable error range for the particular value should be assumed. The term "under suitable condition" or "under suitable reaction condition" refers to any environment that permits a desired reaction to take place.

The term "isolated" refers to a state where it is partially, substantially, or completely free of the materials with which it is associated in nature. By partially or substantially free is meant at least 0.1%, at least 0.5%, at least 18, at least 58, at least 10%, at least 20%, at least 30%, at least 40%, at least 50%, at least 60%, at least 70%, at least 80%, at least 90%, at least 99%, or 100% free of the materials with which it is associated in nature, inclusive of all values falling in between these percentages. Accordingly, as used herein, an "isolated fatty acid" refers to a fatty acid that has been partially, substantially, or completely separated from its biological source (e.g., microbial organism, yeast, bacteria, etc.). The isolated fatty acid may or may not be combined in a formulation with other ingredients for application disclosed herein. An isolated fatty acid may or may not be purified (e.g., free from other environmental contaminants, microbial secretes, or deactivated organisms, etc.), but it is separated from the source organisms.

The present invention is based, in part, on the discover that fatty acids, when sprayed on or applied to a plant, selectively remove the shoot apical meristem, which results in overcompensation and an improvement in one or more agronomical traits including, inter alia, yield (seed numbers), plant resistance, modulation, above and below ground biomass, enhanced drought tolerance, higher photosynthetic rates and higher energy inputs and stress tolerance due to an increase in the number of cellular chloroplasts and mitochondria. Advantageously, application of the fatty acids inhibits the growth or kills a significant number of cells in the shoot apical meristem, without significantly damaging growth of other parts (e.g., stems, leaves, or roots) of the plant.

Accordingly, in one aspect, the present invention provides a method for improving one or more agronomic traits of a plant by applying an effective amount of a composition including one or more fatty acids to the shoot apical meristem of the plant thereby killing or inhibiting the growth of the shoot apical meristem. The method of this invention, may be used to improve agronomic traits including, but not limited to, seed yield, tuber yield, fruit yield, seed pod yield, seed oil content, seed protein content, seed starch content, biomass yield, flower number, drought tolerance, salt tolerance, pest tolerance, pathogen tolerance, disease resistance, fiber yield, wood yield, terpene yield, inulin yield, and/or alkaloid yield.

As used herein, the term "yield" generally refers to a measurable portion or product of commercial value that is produced by the plant such as fruits or vegetables, nuts, seeds (grains), wood (e.g., in the case of silviculture plants) or even flowers (e.g., in the case of gardening plants, ornamentals). The plant products may in addition be further used and/or processed after harvesting. According to the present invention, "increased yield" of a plant, in particular of an agricultural, silvicultural and/or ornamental plant means that the yield of a product of the respective plant is increased by a measurable amount over the yield of the same product of the plant produced under the same conditions, but without removing the shoot apical meristem of the plant. Increased yield may be characterized, among others, by increased plant weight, increased plant height, increased above- and/or below-ground biomass such as higher fresh and/or dry weight, higher grain yield, more tillers, larger leaves, increased shoot growth, increased seed number, increased seed weight, increased seed protein content, increased seed oil content, increased starch content and/or increased pigment content. In some aspects, a plant exposed or contacted with the composition of the invention will exhibit an improvement in seed yield, tuber yield, fruit yield, pod yield, seed oil content, seed protein content, seed starch content, biomass, and/or flower number.

In certain aspects, improved or increased "yield" refers to one or more yield parameters selected from the group of biomass yield, dry biomass yield, aerial dry biomass yield, underground dry biomass yield, fresh-weight biomass yield, aerial fresh-weight biomass yield, underground fresh-weight biomass yield, and/or preferably enhanced yield of seeds (either dry or fresh-weight, or both). In one aspect, an increase in yield refers to increased harvestable yield, biomass yield and/or an increased seed yield. Biomass yield may be calculated on a per plant basis or in relation to a specific area (e.g., biomass yield per acre/square meter/or the like).

The "harvestable yield" of a plant can depend on the specific plant/crop of interest as well as its intended application (such as food production, feed production, processed food production, biofuel, biogas or alcohol production, or the like) of interest in each particular case. Thus, in one aspect, yield is calculated as harvest index (expressed as a ratio of the weight of the respective harvestable parts divided by the total biomass), harvestable parts weight per area (acre, square meter, or the like); and the like.

"Biomass yield" can refer to, e.g., dry weight biomass yield and/or fresh-weight biomass yield. Biomass yield refers to the aerial or underground parts of a plant, depending on the specific circumstances (test conditions, specific crop of interest, application of interest, and the like). In one embodiment, biomass yield refers to the aerial and underground parts. Biomass yield may be calculated as fresh-weight, dry weight or a moisture adjusted basis.

"Seed yield" may be measured by one or more of the following parameters: number of seeds or number of filled seeds (per plant or per area (acre/square meter/or the like)); seed filling rate (ratio between number of filled seeds and total number of seeds); number of flowers per plant; seed biomass or total seed weight (per plant or per area (acre/square meter/or the like); thousand kernel weight (TKW; extrapolated from the number of filled seeds counted and their total weight; an increase in TKW may be caused by an increased seed size, an increased seed weight, an increased embryo size, and/or an increased endosperm). Seed yield may be determined on a dry weight or on a fresh weight basis, or typically on a moisture adjusted basis, e.g., at 15.5 percent moisture.

In some aspects, an increase in yield is conferred by an increase of the intrinsic yield capacity of a plant and can be, for example, manifested by improving the specific (intrinsic) seed yield (e.g., in terms of increased seed/grain size, increased ear number, increased seed number per ear, improvement of seed filling, improvement of seed composition, embryo and/or endosperm improvements, or the like); modification and improvement of inherent growth and development mechanisms of a plant (such as plant height, plant growth rate, pod number, pod position on the plant, number of internodes, incidence of pod shatter, efficiency of nodulation and nitrogen fixation, efficiency carbon assimilation, improvement of seedling vigor/early vigor, enhanced efficiency of germination (under stressed or non-stressed conditions), improvement in plant architecture, cell cycle modifications, photosynthesis modifications, various signaling pathway modifications, modification of transcriptional regulation, modification of translational regulation, modification of enzyme activities, and the like); and/or the like.

In one aspect, an increase in yield is conferred by an improvement or increase of stress tolerance of a plant and can be for example manifested by improving or increasing a plant's tolerance against stress, particularly abiotic stress. In the present application, abiotic stress refers generally to abiotic environmental conditions a plant is typically confronted with, including conditions which are typically referred to as "abiotic stress" conditions including, but not limited to, drought (tolerance to drought may be achieved as a result of improved water use efficiency), heat, low temperatures and cold conditions (such as freezing and chilling conditions), salinity, osmotic stress, shade, high plant density, oxidative stress, and the like. In some aspects, a plant exposed or contacted with the composition of the invention will exhibit an improvement in drought tolerance, pest tolerance, and/or pathogen tolerance.

In another aspect, an improvement in agronomic traits refers to an increase in the nutrient use efficiency of a plant, e.g., by improving the use efficiency of nutrients including, but not limited to, phosphorus, potassium, and nitrogen. For example, there is a need for plants that are capable of using nitrogen more efficiently so that less nitrogen is required for growth and therefore resulting in the improved level of yield under nitrogen deficiency conditions. Further, higher yields may be obtained with current or standard levels of nitrogen use.

Another indicator for the condition of the plant is the "plant vigor." Plant vigor becomes manifest in several aspects such as the general visual appearance. Improved plant vigor can be characterized, among others, by improved vitality of the plant, improved plant growth, improved plant development, improved visual appearance, improved plant stand (less plant verse/lodging), improved emergence, enhanced root growth and/or more root developed system, enhanced nodulation, in particular rhizobial nodulation, bigger leaf blade, increased plant size, increased plant weight, increased plant height, increased tiller number, increased shoot growth, increased root growth (extensive root system), increased size of root mass (extensive root system), increased yield when grown on poor soils or unfavorable climate, enhanced photosynthetic activity, change of color (e.g., enhanced pigment content), earlier flowering, earlier fruiting, earlier and improved germination, earlier (advanced) grain maturity, improved abiotic and/or biotic stress tolerance, less non-productive tillers, less dead basal leaves, less input needed (such as fertilizers or water), greener leaves and increased green leaf area, complete maturation under shortened vegetation periods, less fertilizers needed, less seeds needed, easier harvesting, faster and more uniform ripening, longer shelf-life, longer panicles, delay stronger of senescence, and/or more productive tillers, better extractability of ingredients, improved quality of seeds (for being seeded in the following seasons for seed production), reduced production of ethylene and/or the inhibition of its reception by the plant, spindliness of leaves, and/or increased number of ears/m2.

The improvement or increase in one or more agronomic traits according to the present invention particularly means that the improvement of any one or several or all of the above-mentioned agronomic traits are improved compared to a plant produced under the same conditions, but without removing the shoot apical meristem of the plant (i.e., a plant that has not been contacted with a composition of the invention). For example, yield and yield increase (in comparison to a wild-type, unmodified plant) may be measured in a number of ways known in the art.

In one aspect of the present invention, the agronomic trait, e.g., yield (seed yield, tuber yield, fruit yield, etc.) is increased by at least 5% to 60% (or any range derivable therein) compared to untreated controls. In one aspect, the agronomic trait, e.g., yield (seed yield, tuber yield, fruit yield, etc.) is increased by least 20% compared to untreated controls. According to another embodiment of the present invention, the yield the agronomic trait, e.g., yield (seed yield, tuber yield, fruit yield, etc.) is increased by least 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 55%, 60%, 65%, 70%, 75%, 80%, 85%, 90%, 95%, 100%, or more than 100%, compared to untreated controls. By way of example, if untreated soybeans yielded 6200 bushels of seeds per 100 acres, and if soybeans that received the subject treatment yielded 8500 bushels of seeds per 100 acres under the same growing conditions, then the yield of soybeans would be said to have increased by $((8500-6200)/6200) \times 100 = 37\%$. In some aspects, per hectare yield can be increased by 18, 58, 10%, 158, 20%, 25%, 30%, 35%, 40%, 45%, 50%, 60%, 70%, or more through the removal, or inhibition of growth, of the plant apical meristem.

In some aspects, the improvement in the one or more agronomic traits in a plant contacted with the composition of this invention is comparable or better than the improvement in one or more agronomic traits of a plant subjected to clipping to remove the apical meristem. The term "clipping" means removal or inhibition of the growth of the shoot apical meristem of a plant by any means of mechanical trimming. Mechanical trimming is accomplished by mowing, pruning by hand, or any other method of severing the apical meristem in whole, or in part, from the plant.

The term "plant" is to be understood as a plant of economic importance and/or cultivated plant. A plant is preferably selected from an agricultural, silvicultural and horticultural (including ornamental) plant. The term "plant" as used herein includes all parts of a plant such as germinating seeds, emerging seedlings, herbaceous vegetation as well as established woody plants including all belowground portions (such as the roots) and aboveground portions. Generally, the term "plant" also includes a plant that has been modified by mutagenesis breeding, r genetic engineering. Genetically modified plants are plants, which genetic material has been modified by the use of recombinant DNA techniques. The use of recombinant DNA techniques makes modifications possible that cannot readily be obtained by cross breeding under natural circumstances, mutations or natural recombination.

In some aspects, a plant of the invention includes, but is not limited to, cereals, for example wheat, rye, barley, triticale, oats or rice; beet, for example sugar beet or fodder beet; fruits, such as pomes, stone fruits or soft fruits, for example apples, pears, plums, peaches, almonds, cherries, strawberries, raspberries, blackberries or gooseberries; leguminous plants, such as lentils, peas, alfalfa or soybeans; oil plants, such as rape, mustard, olives, sunflowers, coconut, cocoa beans, castor oil plants, oil palms, ground nuts or soybeans; cucurbits, such as squashes, cucumber or melons; fiber plants, such as cotton, flax, hemp or jute; citrus fruit, such as oranges, lemons, grapefruits or mandarins; vegetables, such as broccoli, spinach, lettuce, asparagus, cabbages, carrots, onions, tomatoes, potatoes, cucurbits or paprika; lauraceous plants, such as avocados, cinnamon or camphor; energy and raw material plants, such as corn, soybean, rape, sugar cane or oil palm; corn; tobacco; nuts; coffee; tea; bananas; vines (table grapes and grape juice grape vines); hop; turf; natural rubber plants or ornamental and forestry plants, such as flowers, shrubs, broad-leaved trees or evergreens, for example conifers; and on the plant propagation material, such as seeds, and the crop material of these plants. In some aspects, the plant is a leguminous plant, such as lentil, pea, peanut, chickpea, kidney bean, lupine, alfalfa or soybean. In other aspects, the plant is soybean, corn, canola, rice, potato, camelina, or sunflower.

The term "meristem" means a region of cells capable of division and growth in plants. Meristematic cells are typically small and nearly spherical. They have a dense cytoplasm and relatively few small vacuoles. Some of these meristematic cells maintain the meristem as a continuing source of new cells and may undergo cell division (mitosis) many times before differentiating into specific cells required for that region of the plant body.

As is conventional in the art, the "shoot apical meristem" is the region in the growing shoot containing meristematic cells. The shoot apical meristem contains multipotent stem cells and produces primordia that develop into all the above ground organs of a plant including the floral meristems. The plant hormone auxin is produced in the shoot apical meristem. Among the many roles of auxin in plant development, it inhibits the production of lateral branches.

The term "lateral meristems" means the meristem in the vascular and cork cambia. Lateral meristems are known as secondary meristems because they are responsible for secondary growth or increase in stem girth and thickness. The term "intercalary meristem" means the meristem at the internodes or stem regions between the places at which leaves attach.

In accordance with the present method, an effective amount of a composition comprising one or more fatty acids is applied to the shoot apical meristem of the plant. As used herein, the term "applying," "applied," "application," or variations thereof, with reference to the composition means that the shoot apical meristem is contacted with the composition of the invention using any suitable means, e.g., sprayed, drenched, or misted. Various applicators may be used to apply the composition of the invention to the shoot apical meristem including, e.g., a hand-held aspirator-type sprayer or other commercial sprayer. Examples of commercial sprayers include the Hagie STS12, STS16 and STS20 models capable of carrying 1200, 1600 and 2000 gallons, respectively, of spray product. Such commercial sprayers may need to be modified with spray arms to target the apical meristems from the upper side of the plants. In some aspects, the spray includes a pressurized nozzle, e.g., a nozzle having a psi of about 40.

To effect overcompensation and an improvement in one or more agronomic traits of a plant, some aspects provide for the killing or inhibition of the growth of the shoot apical meristem at a period between vegetative growth stage 1 (V1) and vegetative growth stage 6 (V6); or a period between vegetative growth stage 1 (V1) and vegetative growth stage 2 (V2); or a period between V2 and vegetative growth stage 3 (V3); or a period between V3 and vegetative growth stage (V4); or a period between V4 and vegetative growth stage 5 (V5); or a period between V5 and vegetative growth stage 6 (V6); or a period between V4 and V6; or at V1, V2, V3, V4, V5 or V6. Ideally, removal of the shoot apical meristem results in minimal or no removal of adjacent V1 tissue if removing the apical meristem between V1 and V2, or minimal or no removal of adjacent V2 tissue if removing the apical meristem between V2 and V3, or minimal or no removal of adjacent V3 tissue if removing the apical meristem between V3 and V4, or minimal or no removal of adjacent V4 tissue if removing the apical meristem between V4 and V5, or minimal or no removal of adjacent V5 tissue if removing the apical meristem between V5 and V6. Shoot apical meristem removal in this invention is by chemical (e.g., application of fatty acid compounds) means.

Depending, in part, on genetics, a plant selection, plant variety, inbred plant, or hybrid plant may not express overcompensation when cells in the apical meristem are killed or their growth inhibited. Thus, plants may be screened to identify those capable of expressing overcompensation, e.g., by treatment of the shoot apical meristem with the composition of the invention or clipping and measuring one or more agronomic traits to determine whether there is an increase in the one or more agronomic traits in the treated plant as compared to a plant not treated with the composition or clipped. Furthermore, the optimal time in the plant growth cycle for removal, or inhibition of growth, of the apical meristem may be determined by treatment of the shoot apical meristem with the composition of the invention at V1, V2, V3, V4, V5 and V6 stages of growth and determining the stage in which there is an increase in one or more agronomic traits as compared to a plant not treated with the composition.

Alternatively, or in addition to, screening of plants and/or growth stage may be conducted at the molecular level. Increasing chromosome number through endoreduplication and therefore gene copy number provides a means of increasing expression of vital genes or genetic pathways that promote rapid regrowth rates following removal, or inhibition of growth, of the apical meristem. Glucose-6-phosphate dehydrogenase (G6PD1) feeds compounds into the oxidative pentose phosphate pathway for nucleotide biosynthesis, by the provision of ribose-5-phosphate, necessary for the significant increase in chromosome number via endoreduplication. The increase in DNA content then feeds back positively on pathways involved in metabolism (e.g., G6PD1) and chemical defense. Endoreduplication leads to increased gene copy number and therefore increased gene expression. Accordingly, gene expression of one or more genes of these pathways may be measured to assess appropriate plants and/or growth stages for use in this invention.

Figures 4, 5:
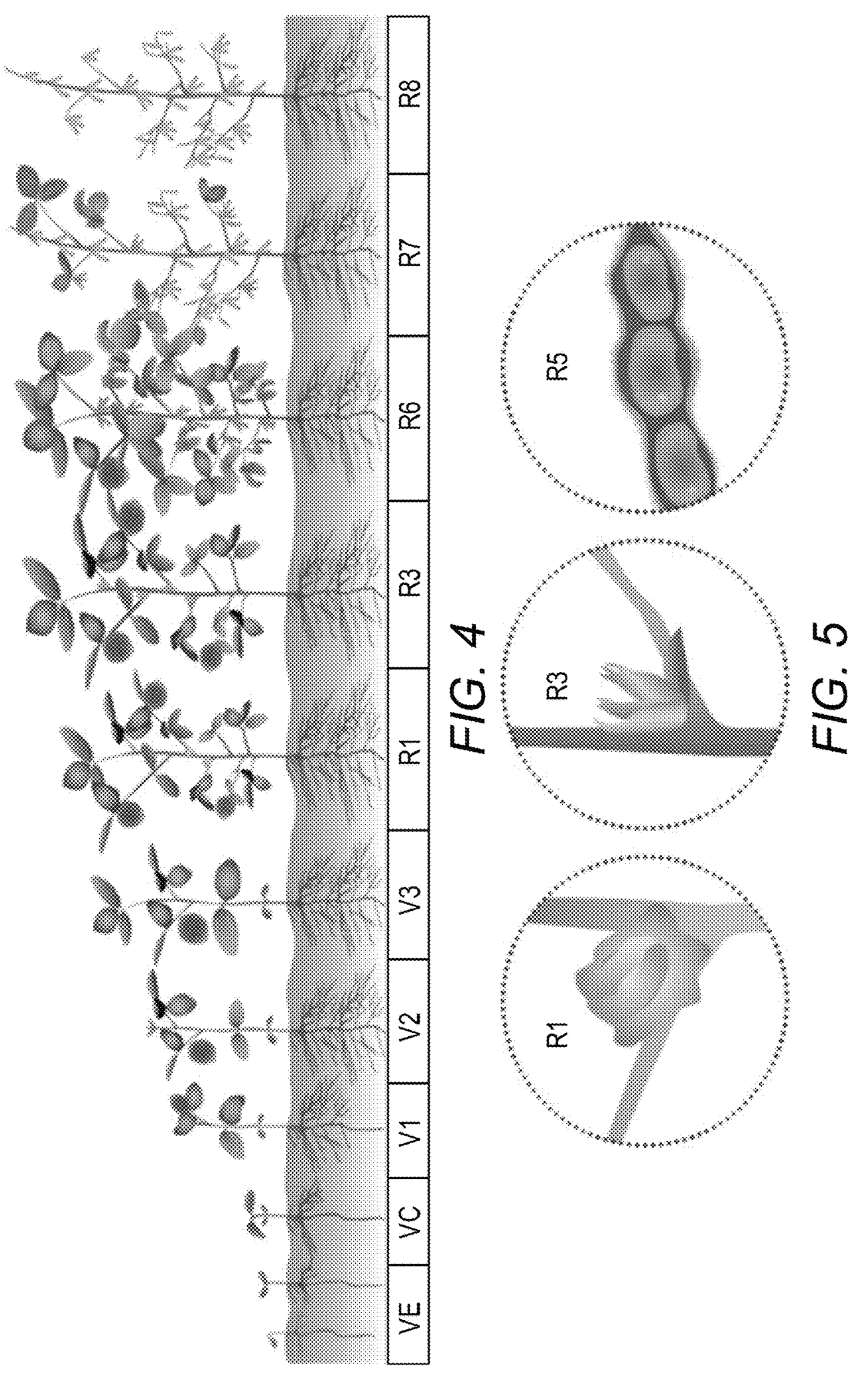
FIG. 4 shows the stages of development of the soybean plant. VE is the stage at which cotyledons emerge and supply energy for the plant for 7 to 10 days. VC is the stage soon after the cotyledons are fully exposed. At VC unifoliate leaves emerge at the second node and begin generating energy through photosynthesis. The V1 stage is when the first trifoliate leaflets form. The V2 stage is when the second trifoliate leaf is established. At V2 root nodules begin to develop. Nitrogen fixation by the plant begins to occur when the plants reach 6 to 8 inches in height. V3 is the stage when the third trifoliate leaf emerges. V4 is when the fourth trifoliate leaf emerges. V5 is when the fifth trifoliate leaf emerges. The V6 stage is when plants develop new growth stages about every 3 days depending on the environmental. At this stage lateral roots should overlap in 30-inch rows or less. At R1 flowering begins on the third to sixth node and continues up and down the main stem. Flowering eventually moves to the branches. Nodes on the main stem usually have at least one flower. Vertical roots as well as secondary roots and root hairs continue to grow rapidly until R4 and R5. At stage R2 and open flower develops at one of the top two modes of the main stem. The plant has accumulated about 25% of its total dry weight and nutrients and about 50% of its mature height. Nitrogen fixation by root nodules increases rapidly at this stage. At stage R3 a pod on at least one of the upper four nodes is at least ³⁄₁₆-inch long or longer. At stage R4 the pods are growing rapidly, and seeds are developing. At stage R5 at least one ⅛-inch-long seed is present in a pod at one of the four upper-most nodes. About half of the nutrients required for seed filling come from the plant's vegetative parts and about half from N fixation and nutrient uptake by the roots. Nitrogen fixation peaks at this stage. Stage R6 is known as the "green bean" stage because it marks the beginning of the full seed stage. At stage R7 at least one normal pod on the main stem reaches its brown or tan mature color. Seed dry matter begins to peak. Seeds and pods begin to lose green color. At stage R8 at least 95% of the pods on a plant have reached their mature color and the plant is fully mature. Typically, about 5 to 10 days of good drying weather after stage R8 is needed to obtain a harvest seed moisture content of less than 15%.
FIG. 5 shows the reproductive stages of soybean development. At the R1 stage flowers form. At the R3 stage pod development begins. At the R5 stage seed development begins.

It is understood that a skilled person will be able to determine/identify the V1, V2, V3, V4, V5 and V6 stages of a particular crop concerned. See, e.g., FIG. 4 and FIG. 5. For example, V1 of determinate and indeterminate dry bean such as soybean is when the first fully developed trifoliolate at the third node appears, e.g., at approximately 10-20 days after seeding; V2 is when the second trifoliolate (count when leaf edges no longer touch) appears at approximately 19-25 days after seeding; V3 is when the third trifoliate appears after 25-32 days after seeding; V4 is when the fourth trifoliate appears after 40-47 days; V5 is when the fifth trifoliate appears after 47-54 days, and V6 is when the sixth trifoliate appears after 54-61 days. Similar to dicots, V1 of a monocot such as corn is when the first round-tipped leaf on first collar appears, and nodal roots elongate. By V2, the monocot may be 2 to 4 inches tall and rely on energy in the seed. V3 begins 2 to 4 weeks after VE (emergence), and the plant switches from kernel reserves to photosynthesis and nodal roots begin to take over. Notably, in corn, a plant with 3 collars is considered V3, however, there may be 5 to 6 leaves showing on the plant. At the V4 stage, the fourth leaf collar is visible. At the V5-V6 stage, leaf collars are visible, the growing point is above the soil surface, the critical period of nitrogen uptake begins, and kernel row numbers are determined. Given that growth stages can overlap, a crop of plants is in a particular growth stage when 50% or more of the plants of the crop are in or beyond that stage. Moreover, if senescence of the lower leaves has occurred, leaf scars (excluding those where the cotyledons were attached) are counted to determine the proper stage. Removal or inhibition of the growth of the apical meristem may occur within the 3-to-10-day window between stages V1 and V2, or V2 and V3, or V3 and V4, or V4 and V5, or V5 and V6. In addition, depending on the plant variety, geographic region, or agronomic conditions, the apical meristems of the plants may be removed early or later in plant growth.

Subsequent to treatment of the plant with the composition of this invention, the plant is grown for a sufficient amount of time to exhibit an improvement in one or more agronomic traits. In some aspects, the plant is grown to a stage when one or more commercially relevant portions of the plant are harvestable. The term "commercially relevant portion of the plant" refers to one or more portions of a plant that is obtained at some time during the plant growing cycle for direct or indirect consumption or in another application.

Accordingly, the method of the invention further includes the step of harvesting one or more commercially relevant portions of the plant. The commercially relevant portion of the plant may be a plant part such as a tuber, seed, seed pod, fruit, leaf, stem, root, or one or more chemicals or processed portions of the plant. A commercially relevant portion of the plant may be any of one or more natural plant products such as starch, oil, protein, carbohydrates, fiber, terpenes, or the like.

In one aspect, the invention provides a method of improving one or more agronomic traits of a plant by (a) applying an effective amount of a composition comprising one or more fatty acids to the shoot apical meristem of the plant that kills or inhibits the growth of cells in the shoot apical meristem between (i) vegetative stage 1 and vegetative stage 2, (ii) vegetative stage 2 and vegetative stage 3, (iii) vegetative stage 3 and vegetative stage 4, (iv) vegetative stage 4 and vegetative stage 5, or (v) vegetative stage 5 and vegetative stage 6 of development, (b) allowing the plant to grow, and (c) harvesting one or more commercially relevant portions of the plant wherein the plant exhibits one or more improved agronomic traits compared to untreated control plants.

In some aspects of this invention, the composition and method of the invention include one or more fatty acids (e.g., 1, 2, 3, 4 or 5 fatty acids). In some aspects, the one or more fatty acids have the structure of formula (I):

$$X\text{—}C(O)\text{—}OR1 \tag{I,}$$

wherein X is a linear or branched C4-C30-alkyl group optionally containing 1 to 6 carbon-carbon double bonds, and R1 is H or C1-C6-alkyl. Representative examples of fatty acids to include in the composition for inhibiting the growth of the apical meristem include the following saturated fatty acids: caprylic acid ($CH_3(CH_2)_8COOH$), capric acid ($CH_3(CH_2)_{10}COOH$), lauric acid ($CH_3(CH_2)_{12}COOH$), myristic acid ($CH_3(CH_2)_{14}COOH$), palmitic acid ($CH_3(CH_2)_{16}COOH$), stearic acid ($CH_3(CH_2)_{18}COOH$), arahidic acid ($CH_3(CH_2)_{20}COOH$), behenic acid ($CH_3(CH_2)_{22}COOH$), lignoceric acid ($CH_3(CH_2)_{24}COOH$), and cerotic acid ($CH_3(CH_2)_{26}COOH$). Representative examples of fatty acids to include in the composition for inhibiting the growth of the apical meristem include the following unsaturated fatty acids: myristoleioc acid ($CH_3(CH_2)_3CH\!\!=\!\!CH(CH_2)_7COOH$), palmitoleic acid ($CH_3(CH_2)_5CH\!\!=\!\!CH(CH_2)_7COOH$), sapienic acid ($CH_3(CH_2)_8CH\!\!=\!\!CH(CH_2)_4COOH$), oleic acid ($CH_3(CH_2)_7CH\!\!=\!\!CH(CH_2)_7COOH$), vaccenic acid ($CH_3(CH_2)_5CH\!\!=\!\!CH(CH_2)_9COOH$), and linoleic acid (($CH_3(CH_2)_4CH\!\!=\!\!CHCH_2CH\!\!=\!\!CH(CH_2)_7COOH$).

In some aspects, the one or more fatty acids include methyl decanoate, 1-decanol, and/or methyl nonanoate. In some aspects, the fatty acid is methyl decanoate. In some aspects, the fatty acid is 1-decanol. In some aspects, the fatty acid is methyl nonanoate. In some aspects, the fatty acid is a combination of methyl decanoate and 1-decanol. In some aspects, the fatty acid is a combination of methyl decanoate and methyl nonanoate. In some aspects, the fatty acid is a combination of 1-decanol and methyl nonanoate.

In some aspects of this invention, the one or more fatty acids of the composition and method of the invention include a combination of lower alkyl esters of the C6 to C12 fatty acids and C6 to C12 fatty acid alcohols in aqueous emulsions. In some aspects, the one or more fatty acids include a combination of methyl esters of C6, C8, C10, and C12 fatty acids. In particular, the one or more fatty acids of the composition of the invention include a combination of: a methyl ester of a C6 fatty acid (methyl hexanoate), a methyl ester of a C8 fatty acid (methyl octanoate), a methyl ester of a C10 fatty acid (methyl decanoate), and a methyl ester of a C12 fatty acid (methyl laureate). In particular aspects, the composition is composed of about 4% methyl hexanoate; about 56% methyl octanoate; about 38% methyl decanoate; and about 2% methyl laureate, based on total amount of fatty acid of the composition.

In accordance with the method and composition of this invention, an effective amount of one or more fatty acids is used. The effective amount used may be dependent upon the plant and/or plant variety being treated, the formulation of the composition, the mode or rate of application, environmental conditions, and/or growth stage in which the composition is applied. In general, the concentration of the one or more fatty acids in the composition of this invention may be at least about 0.01 M (e.g., 0.01, 0.015, 0.025, 0.03, 0.035, 0.04, 0.045, 0.05, 0.055, 0.06, 0.07, 0.08, 0.09, 0.1, 0.2, 0.3, 0.4, 0.5, 0.6, 0.7, 0.8, 0.9, 1.0, 2.0, 3.0, 4.0, 5.0, 6.0, 7.0, 8.0, 9.0, 10.0 M or more). In some aspects, the one or more fatty acids in the composition of this invention may be at least about 0.025 M. In some aspects, the one or more fatty acids in the composition of this invention may be at least about 0.05 M. In some aspects, the one or more fatty acids in the composition of this invention may be at least about 0.1 M. In some aspects, the one or more fatty acids are present in the composition at a concentration in the range of 0.025 M to 0.50 M (e.g., 0.025, 0.03, 0.035, 0.04, 0.045, 0.05, 0.055, 0.06, 0.065, 0.07, 0.075, 0.08, 0.085, 0.09, 0.095, 0.1, 0.2, 0.3, 0.4 or 0.5 M). In some aspects, the one or more fatty acids are present in the composition at a concentration in the range of 0.025 M to 0.10 M.

In some aspects, the fatty acid component of the composition is in the range of about 20% to 60% (e.g., about 20%, 25%, 30%, 35%, 40%, 45%, 50%, 55%, or 60%) by weight of the composition. In some aspects, the fatty acid component of the composition is in the range of about 45% by weight of the composition. By way of illustration, the total quantity of the methyl hexanoate, methyl octanoate, methyl decanoate and methyl laureate in the composition may be about 3.72 lbs per gallon and each fatty acid is present at about 4%, 56%, 38%, and 2%, respectively, of total fatty acids.

In addition to one or more fatty acids, the composition of this invention may also include one or more surfactants (e.g., 1, 2, 3, 4, or 5 surfactants). As used herein, the term "surfactant" or "emulsifier" describes a chemical substance that acts as a stabilizer for emulsions, preventing liquids that are immiscible with one another from separating, typically by increasing the kinetic stability of the emulsion by, e.g., lowering the interfacial tension between the liquids. In some aspects, the surfactant is an inert component of the composition.

Surfactants typically have a lipophilic group and a hydrophilic group, and can be categorized as ionic (e.g., cationic, anionic or zwitterionic) or nonionic agents. In some aspects of this invention, the one or more surfactants are nonionic. In some aspects, the one or more nonionic surfactants include at least one fatty acid group, at least one polyethoxy group, or more than one ethoxy group, and at least one polyol (diol, triol or higher alcohol), wherein the fatty acid and polyol may be combined in hydroxyl-fatty acid. In some aspects, the one or more surfactants are polyoxyethylene sorbitan monoesters, such as the laurates, palmitates, stearates, and oleates. The preferred average number of oxyethylene groups per molecule is about 20, although sorbitan monoesters containing from about 10 to about 30 oxyethylene groups per molecule are similarly useful. In some aspects, the one or more fatty acids include one or more polyoxyethylene sorbitan esters, polyoxyethylene alcohols, alkylarylpolyether alcohols, phthalic glycerol alkyl resins, ethoxylated imidazoline, decanoic acid, diglycol oleate, polyether sulfonates, alkylaryl sulfonates, and mixtures thereof.

Representative examples of nonionic surfactants that are usable in the context of the present invention include, without limitation, polyoxyethlene (20) sorbitan monolaurate (sold under the tradename TWEEN® 20), polyoxyethylene (4) sorbitan monolaurate (sold under the tradename TWEEN® 21), polyoxyethylene (2) sorbitan monopalmiate (sold under the tradename TWEEN® 40), polyoxyethlene (20) sorbitan monstearate (sold under the tradename TWEEN® 60), polyoxyethylene (20) sorbitan monooleate (sold under the tradename TWEEN® 80), ethoxylated imidazoline (ACL-429), polyoxyethylene fatty glyceride (G 1288 or G 1300) (polyoxyethylene fatty glyceride), and polyoxyethylene (12) dodecylophenol (Tergitoal 12-P-12).

In some aspects, the composition comprises one or more surfactants and one or more fatty acids comprising (i) methyl decanoate, 1-decanol, or methyl nonanoate; or (ii) a combination of methyl esters of C6, C8, C10, and C12 fatty acids. In some aspects, the composition consists of one or more surfactants and one or more fatty acids selected from the group of (i) methyl decanoate, 1-decanol, and methyl nonanoate; and (ii) a combination of methyl esters of C6, C8, C10, and C12 fatty acids. According to this invention, "consists of" or "consisting of" is not meant to exclude a solvent (e.g. water or combination of inert solvents) into which the fatty acid and optional surfactant are dissolved/suspended. In some aspects, the composition comprises or consists of one or more surfactants and methyl decanoate. In some aspects, the composition comprises or consists of one or more surfactants about 4% of the methyl ester of the C6 fatty acid; about 56% of the methyl ester of the C8 fatty acid; about 38% of the methyl ester of the C10 fatty acid; and about 2% of the methyl ester of the C12 fatty acid, based on total fatty acid of the composition. In one aspect, the composition comprises or consists of methyl decanoate and polyoxyethylene sorbitan monolaurate. In some aspects, more one surfactant is included in the composition. In some aspects, each of the surfactants (e.g., two or more surfactants) is present at an equal concentration by weight of the composition. In other aspects, the one or more surfactants are present at a 1:1 ratio (or 1:2 or 2:1), by weight, with the one or more fatty acids of the composition.

In addition to one or more fatty acids, the composition of the invention may include one or more suitable fungicides, bactericides, and/or pesticides. The selection of the appropriate fungicide(s), bactericide(s), and/or pesticide(s) may be readily and empirically determined by methods well known to the skilled artisan and will vary depending on the plant species, geographic region, environmental factors, and other factors.

Suitable fungicides include, but are not limited to, Chlorothalonil, copper-based fungicides (such as Bordeaux mixture, copper hydroxide, copper sulfate), Mancozeb, Azoxystrobin, Pyraclostrobin, *Bacillus subtilis*, Trifloxystrobin, Tebuconazol, Propiconazole, Myclobutanil, Cyprodinil, Fenhexamid, thiophanate-methyl, Captan, and Difenoconazole.

Suitable bactericides include, but are not limited to, copper-based bactericides (such as Bordeaux mixture, copper hydroxide, copper sulfate), Streptomycin sulfate, Oxytetracycline (e.g., sold under the tradename MYCOSHIELD®), *Bacillus subtilis, Bacillus amyloliquefaciens, Pseudomonas fluorescens*, hydrogen dioxide (hydrogen peroxide), peroxyacetic acid (peracetic acid), sodium hypochlorite (bleach, when properly diluted), and quaternary ammonium compounds.

Suitable pesticides include, but are not limited to, copper-based fungicides (e.g., copper sulfate, copper hydroxide),

*Bacillus thuringiensis* (a biological control for various caterpillar pests), Spinosad (derived from the soil bacterium *Saccharopolyspora spinosa* and effective against a range of pests like caterpillars, thrips, and leafminers), neem oil (derived from the seeds of the neem tree and effective against various pests and fungi), pyrethrin (derived from *chrysanthemum* flowers, effective against a broad range of insects), insecticidal soaps (potassium salts of fatty acids and effective against soft-bodied pests like aphids and whiteflies, horticultural oils (highly refined petroleum oils or plant-based oils effective against a variety of pests and some diseases), diatomaceous earth (composed of crushed diatom fossils, and effective against crawling insects, biological fungicides (microbial-based products like *Bacillus subtilis, Trichoderma* spp., and *Streptomyces* spp. and effective against various fungal diseases.

When methyl decanoate is used for removing the apical meristem, it may be used at a concentration in the range of about 0.01 M and 10 M, of about 0.01 M and 1 M, of about 0.01 M and 0.6 M, or of about 0.1 M and 0.6 M. For the preparation of 0.05 M and 0.06M methyl decanoate, 9.3 g/L and 11.17 g/L, respectively, or 35.15 g/gallon and 42.25 g/gallon, respectively are prepared. One thousand grams of methyl decanoate is mixed with an equal weight of the surfactant polyoxyethylene sorbitan monolaurate. The fatty acid is thoroughly mixed with the surfactant before any water is added. Water is slowly added until the mixture thickens or forms a gel. With continuous mixing, water is added to a volume of 28.45 gallons to form the 0.05 M methyl decanoate:polyoxyethylene sorbitan monolaurate composition. With continuous mixing, water is added to a volume of 23.67 gallons to form the 0.06 M methyl decanoate:polyoxyethylene sorbitan monolaurate composition.

The following examples are provided for illustrative purposes only and not intended to limit the scope of the claims.

EXAMPLE 1: Field Trial 1

Field trial 1 was conducted in Pleasant Plants, Illinois. A single soybean variety was used in the field trial. The soybean variety was planted in 20 plots. Each plot was composed of 8 rows of plants spaced 30 inches apart and was 50 feet long by 20 feet wide. Soybeans were treated with 0.10 M methyl decanoate spray. An undiluted surfactant, polyoxyethylene sorbitan monolaurate, was added in equal weight to the fatty ester. Additional spray was applied by completion of a second pass with 0.10 M methyl decanoate spray. The second pass was completed immediately after the initial treatment of each row to saturate the apical meristem.

Soybean plants were sprayed using an individual chemical spray backpack. The plants were sprayed with approximately 2.5 gallons/1000 sq feet of 0.1 M (or an equivalent of 110 gallons/acre) with the double pass. Soybean plants were sprayed with methyl decanoate at the V5 growth stage.

The overall experiment was designed to distribute untreated control plots and mechanically clipped plants at the same growth stage with the methyl decanoate treated variety across the test field. The results of this analysis demonstrated that plants treated with methyl decanoate increased seed yield compared to untreated control plants (FIG. 1).

EXAMPLE 2: Field Trial 2

Field trial 2 was conducted at GroAlliance in Mt Pulaski, Illinois and planted with a soybean variety. Soybean plants were treated with a spray containing 0.10 M methyl decanoate and polyethylene sorbitan monolaurate. Soybean plants were sprayed using individual chemical backpack spray units. The soybean plants were treated with methyl decanoate at or between the growth stages of V3 and V4.

Figure 2:
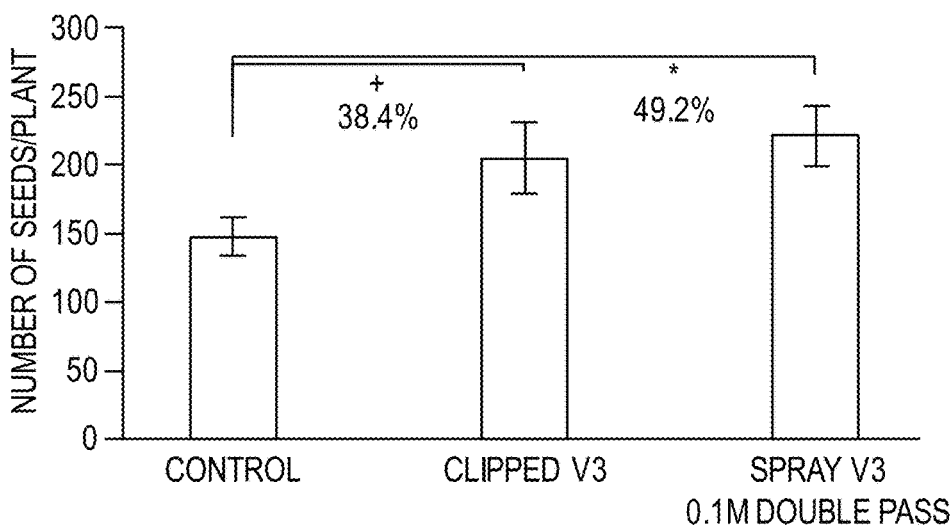
FIG. 2 provides an example of an increase in soybean seed production following the removal of apical dominance by spraying with a double pass of 0.1M methyl decanoate (220.6±21.96 seeds/plant on average) at the V3 stage of growth compared to untreated controls (147.88±13.59 seeds/plant on average) conducted in Mt. Pulaski, Illinois. These results are similar to those from mechanical clipping (204.7±26.16 seeds/plant on average), with no statistical difference between sprayed and mechanically clipped plants (p>0.05) resulting in a 38.4% and 49.2% higher seed production, respectively, than the untreated control (F=2.74, 2, 25 df, p=0.084). Asterisks show significance differences at the 0.05 level, + indicates a marginally significant difference at <0.10.

The test field was subdivided into plots with the dimensions of five rows by 10 feet. Two plots were designated for each soybean variety for spray treatment and distributed geographically across the full test field. Untreated control plots and mechanically clipped plants at the same growth stage were adjacent to the test plot areas. The results of this analysis demonstrated that plants treated with methyl decanoate increased seed yield compared to untreated control plants (FIG. 2).

EXAMPLE 3: Field Trial 3

Field trial 3 was conducted in Lowell, Indiana and a single soybean variety was tested. Soybean plants were treated with a double pass of methyl decanoate at a concentration of 0.10 M. The methyl decanoate spray contained an undiluted surfactant, polyoxyethylene sorbitan monolaurate, that was added in equal weight to the fatty ester.

Figure 3:
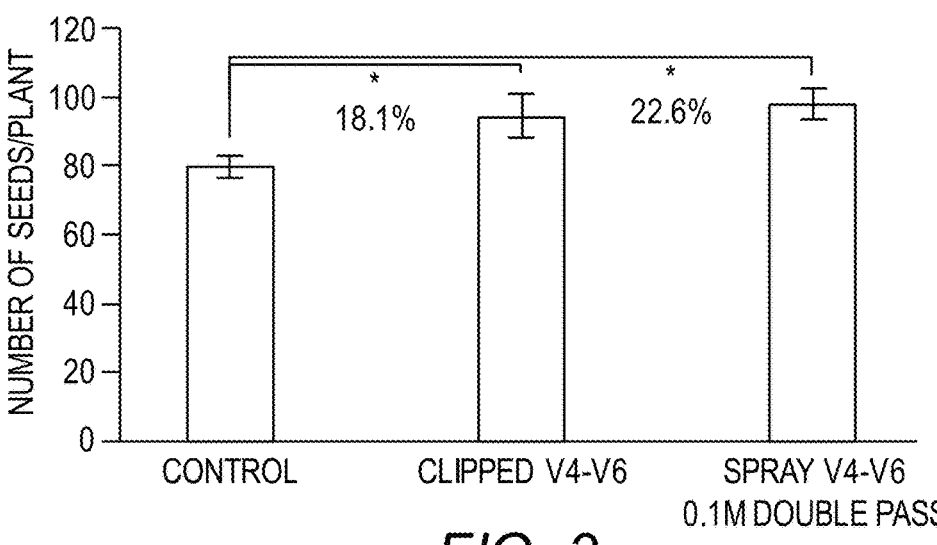
FIG. 3 provides an example of an increase in soybean seed production following the removal of apical dominance by spraying with a double pass of 0.1M methyl decanoate (97.85±4.43 seeds/plant on average) at the V4-V6 stage of growth compared to untreated controls (79.81±3.09 seeds/plant on average) conducted in Lowell, Indiana. These results are similar to those from mechanical clipping (94.27±6.56 seeds/plant on average), with no statistical difference between sprayed and mechanically clipped plants (p>0.05) resulting in a 22.6% and 18.1% higher seed production, respectively, than the untreated control (F=5.63, 2, 247 df, p=0.005). Asterisks show significance differences at the 0.05 level.

Soybean plants were treated the methyl decanoate spray using a backpack spray unit. Soybeans were sprayed in between growth stages V4-V6. The test plots were 21 rows by 50 feet. The results of this analysis demonstrated that plants treated with methyl decanoate increased seed yield compared to untreated control plants (FIG. 3).

Similar experiments were conducted using a composition composed of 4% methyl hexanoate, 56% methyl octanoate, 38% methyl decanoate, and 2% methyl laurate, based on total amount of fatty acid of the composition. Initial studies were carried at a single concentration, which was too high. However, dilution of the composition is expected to result in similar results as that of methyl decanoate.

The invention claimed is:

1. A method of improving one or more agronomic traits of a cereal, beet, leguminous plant, oil plant, cucurbit, fiber plant or other vegetable comprising applying a composition comprising an effective amount of methyl decanoate and optionally 1-decanol and/or methyl nonanoate to the shoot apical meristem of the plant thereby killing or inhibiting the growth of the shoot apical meristem and improving one or more agronomic traits of the cereal, beet, leguminous plant, oil plant, cucurbit, fiber plant or vegetable as compared to an untreated control plant, wherein the composition is applied in at least a first treatment and a second treatment, the second treatment being immediately after the first treatment, to saturated the shoot apical meristem with the composition, and the methyl decanoate and optional 1-decanol and/or methyl nonanoate are each present in the composition at a concentration of 0.05 M to 0.60 M, and wherein the composition is applied to the shoot apical meristem of the plant during the vegetative growth stage 3 (V3).

2. The method of claim 1, wherein the composition further comprises one or more surfactants selected from the consisting group of polyoxyethylene sorbitan esters, polyoxyethylene alcohols, alkylarylpolyether alcohols, phthalic glycerol alkyl resins, ethoxylated imidazoline, decanoic acid, diglycol oleate, polyether sulfonates, alkylaryl sulfonates, and mixtures thereof.

3. The method of claim 1, wherein the one or more agronomic traits is selected from the group consisting of seed yield, tuber yield, fruit yield, pod yield, seed oil content, seed protein content, seed starch content, biomass, flower number, drought tolerance, pest tolerance, and pathogen tolerance.

4. The method of claim 1, wherein the cereal plant is selected from the group consisting of wheat, rye, barley, triticale, oats, or rice; the beet is selected from the group consisting of sugar beet and fodder beet; the leguminous plant is selected from the group consisting of lentil, pea, alfalfa, peanut, chickpea, kidney bean, lupine, and soybean; the oil plant is selected from the group consisting of rape, mustard, sunflower, castor oil plant, camelina, canola, and ground nut; the cucurbit is selected from the group consisting of squash, cucumber, and melon; the fiber plant is selected from the group consisting of cotton, flax, hemp, and jute; and the vegetable is selected from the group consisting of broccoli, spinach, lettuce, asparagus, cabbage, carrot, onion, tomato, potato, and paprika.

5. The method of claim 1, further comprising harvesting one or more commercially relevant portions of the plant.

6. The method of claim 5, wherein the commercially relevant portion of the plant is selected from the group consisting of seeds, tubers, fruit, pods, oil, protein, starch, leaves, fiber, terpenes, and wood.

\* \* \* \* \*